US011609619B1

(12) United States Patent
Now et al.

(10) Patent No.: US 11,609,619 B1
(45) Date of Patent: Mar. 21, 2023

(54) QUICK FACTORY RESET APPLICATION

(71) Applicants: Leo Now, South San Francisco, CA (US); Craig Dong, Clayton, CA (US)

(72) Inventors: Leo Now, South San Francisco, CA (US); Craig Dong, Clayton, CA (US)

( * ) Notice: Subject to any disclaimer, the term of this patent is extended or adjusted under 35 U.S.C. 154(b) by 0 days.

(21) Appl. No.: 17/361,069

(22) Filed: Jun. 28, 2021

(51) Int. Cl.
*G06F 1/24* (2006.01)
*G06F 21/62* (2013.01)

(52) U.S. Cl.
CPC ............ *G06F 1/24* (2013.01); *G06F 21/6254* (2013.01)

(58) Field of Classification Search
CPC ................................ G06F 1/24; G06F 21/6254
USPC ............................................................ 713/1
See application file for complete search history.

(56) References Cited

U.S. PATENT DOCUMENTS

2009/0031122 A1* 1/2009 Hodzic ..................... G06F 1/24
713/1
2017/0168533 A1* 6/2017 Rhoads ................. G06F 9/4406

FOREIGN PATENT DOCUMENTS

KR 20060032260 A * 4/2006 ........... G09G 3/3406
WO WO-2016072833 A1 * 5/2016 ........... G06F 11/1441

OTHER PUBLICATIONS

"Remotely Wiping Sensitive Data on Stolen Smartphones", white paper Asia CCS'14, June 4-6, 2014, Kyoto, Japan., Available on the Internet at http://dx.doi.org/101145/2590296.2590318. This reference contains copyrighted material: Copyright 2014 ACM 978-1-4503-2800-May 14, 2006. Abstract uploaded via EFS-Web.

* cited by examiner

*Primary Examiner* — Chun Cao
(74) *Attorney, Agent, or Firm* — QuickPatents, LLC; Kevin Prince

(57) ABSTRACT

A processor-enabled method of deleting data of a user on an electronic device of the type having a processor, a volatile memory, a non-volatile memory, a display, and a user interface, includes the steps of A) providing a software application resident in the non-volatile memory of the electronic device, B) running the software application so that the software application is in a standby mode, and c) in an emergency situation, the user using the user interface to activate a data destruction routine of the software application. The data destruction routine performs the steps: 1) turning off the display of the electronic device, or alternately displaying all black pixels on the display, 2) overwriting the data of the user in the non-volatile memory with decoy data, and 3) initiating the factory-reset module. The decoy data may be all zeros, all ones, or random values, for example.

14 Claims, 3 Drawing Sheets

QUICK FACTORY RESET APPLICATION

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to data protection, and more particularly to an application for quickly resetting a portable electronic device to a factory condition.

BACKGROUND

Electronic devices such as smart phones, tablet computers, and laptop computers are convenient tools for conducting business and personal affairs alike. However, such electronic devices can also prove to be a liability in situations where the personal data on such electronic devices is obtained by those with malicious intent. For example, personal financial records or business secrets may be stored on such devices.

Therefore, there is a need for a method of protecting such personal data if it appears to a user of such an electronic device that the electronic device will be falling into the wrong hands. Such a needed method would be easy to activate, and once activated would not be easily halted. Such a needed invention would provide for discrete activation, but would be difficult to activate inadvertently. The present invention accomplishes these objectives.

SUMMARY OF THE INVENTION

The present invention is a processor-enabled method of deleting data of a user on an electronic device, such as a smart phone, tablet computer, or the like. Such an electronic device is of the type having a processor, a volatile memory, a non-volatile memory, a display, and a user interface. The electronic device also includes a factory-reset module that restores the non-volatile memory and volatile memory to an initial factory setting, absent any user data.

The method includes the steps of providing a software application resident in the non-volatile memory of the electronic device. In situations where the user believes he may need to protect his data, the user can run the software application so that the software application is in a standby mode, ready to be activated if receiving a proper input from the user with the user interface. In certain situations the user may decide to active the software application upon starting the electronic device, so that the software application is always resident in the volatile memory of the electronic device and relatively easy to activate.

Then, in emergency situations requiring the protection of the data, typically to prevent a third party from accessing the date of the user, the user uses the user interface to activate a data destruction routine of the software application. For example, if the user is being kidnapped and the data on the electronic device might be valuable to the perpetrators of the kidnapping, the user can activate the data destruction routine. The data destruction routine performs the steps: 1) turning off the display of the electronic device, or alternately displaying all black pixels on the display, or turning off the display of the electronic device and locking the user interface, 2) overwriting the data of the user in the non-volatile memory with decoy data, and 3) initiating the factory-reset module. The decoy data may be all zeros, all ones, or random values, for example.

In some embodiments, the user interface may include mechanical buttons on the electronic device. In alternate embodiments the user interface may include one or more so-called "soft buttons," which may be displayed on a lock screen of the electronic device, the display in such an embodiment having a touch-screen interface. The user in such embodiments may have to activate all of the mechanical buttons simultaneously, or all of the software buttons displayed on the lock screen of the electronic device, or some combination thereof, in order to activate the data destruction routine. Requiring the user to actuate multiple of the user interface buttons, reduces the change of inadvertent activation of the data destruction routine.

In order to quickly destroy the data on the electronic device when the data destruction routine is activated, with electronic devices that include a file index or one or more key functional locations, the file index and/or the one or more key functional locations are overwritten with the decoy data first, before overwriting the remaining portions of the user's data. In such an embodiment the one or more key functional locations may include program or application files, display memory locations, operating system memory locations, or the like.

The present invention is a method of protecting such personal data if it appears to a user of an electronic device that the electronic device may be confiscated by one or more bad actors with malicious intent. The present method is easy to activate, and once activated is not easily stopped. The present invention provides for discrete activation, but is also difficult to activate inadvertently. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
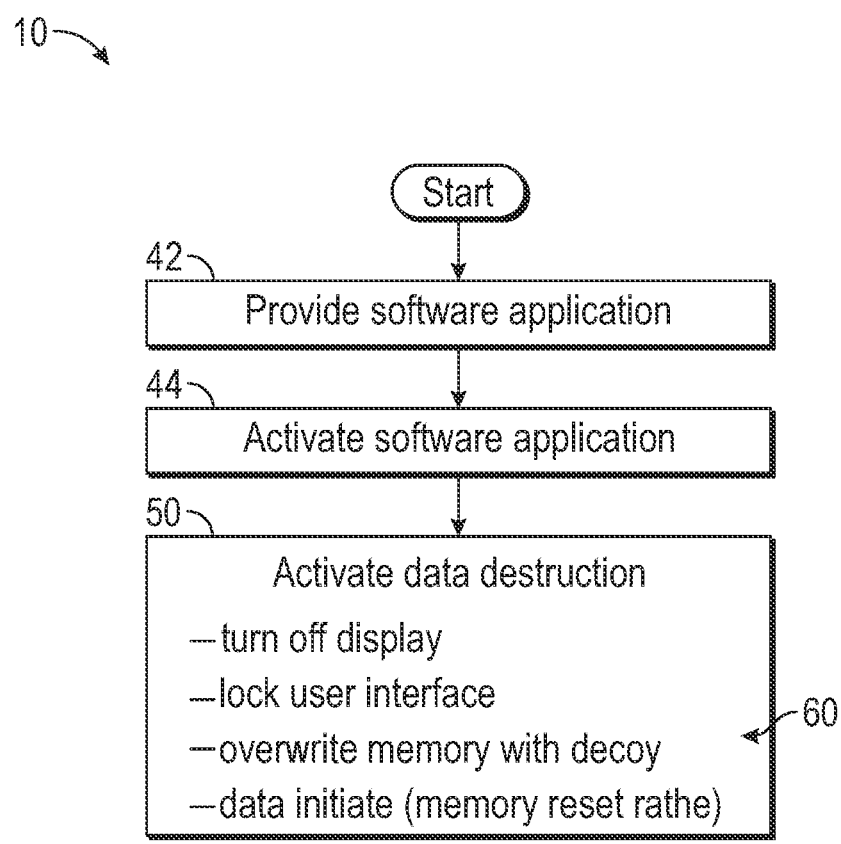
FIG. 1 is a flow chart of a method of the present invention.
Figure 2:
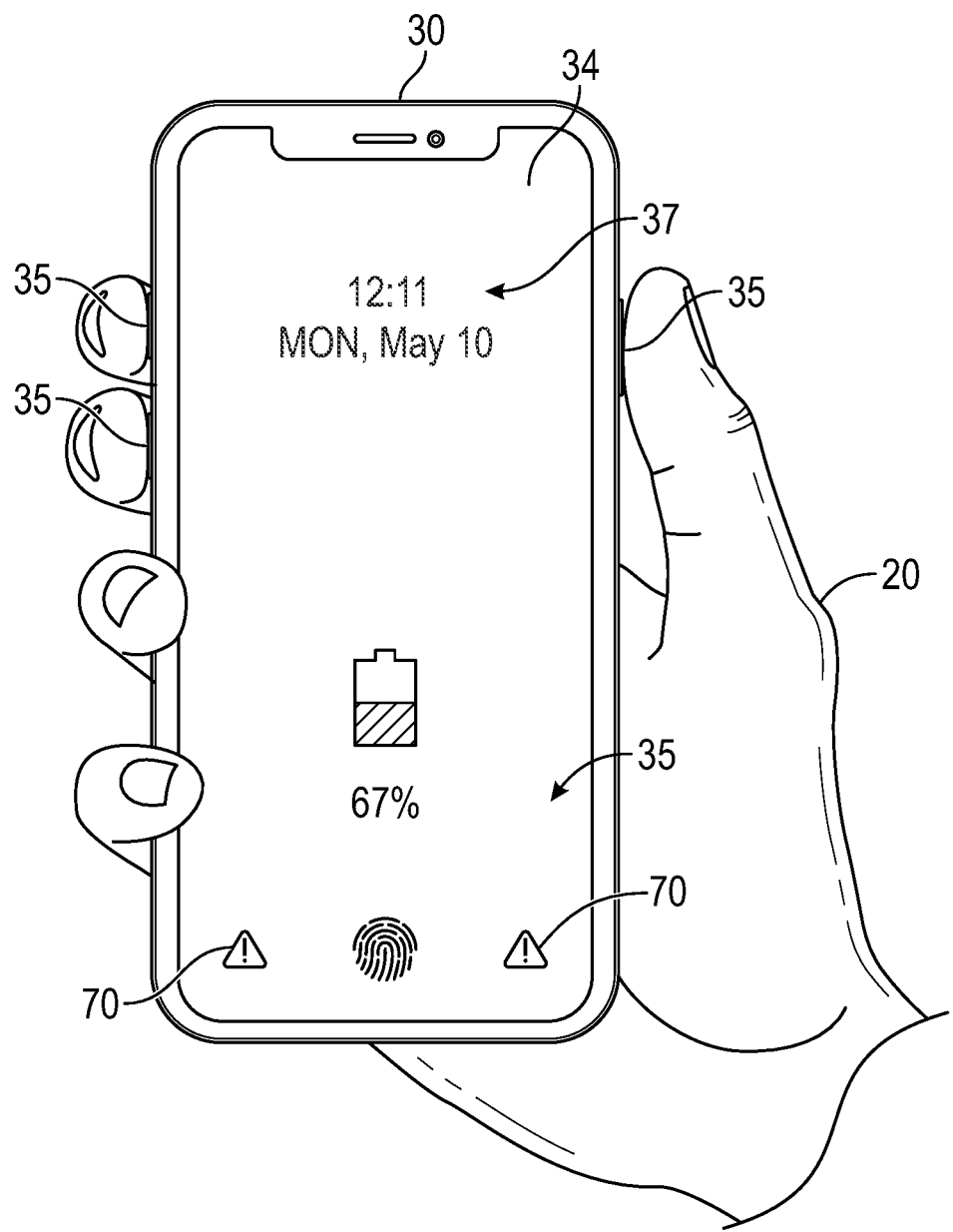
FIG. 2 is a front elevational view of an electronic device running a software application of the present invention that implements the method of the present invention.
Figure 3:
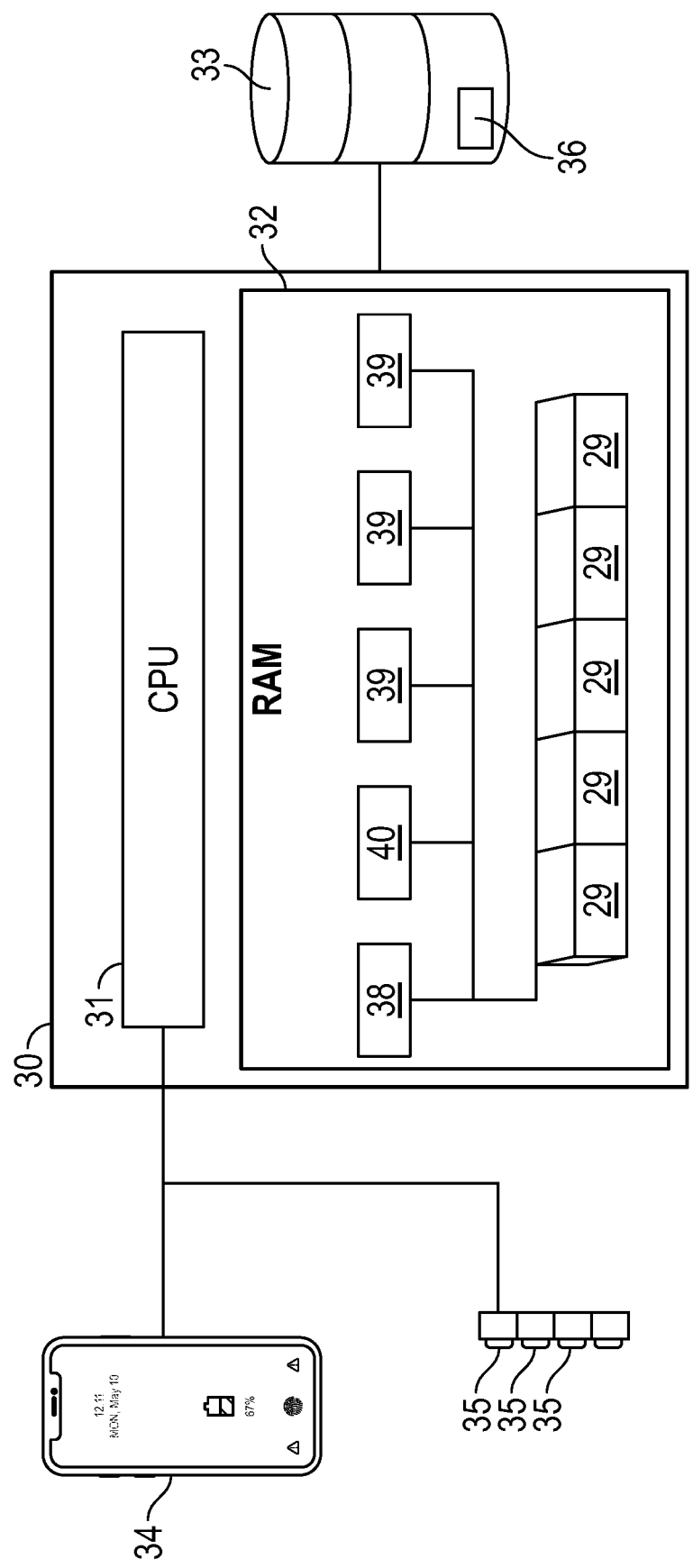
FIG. 3 is a system diagram of the present invention.

FIGS. 1-3 illustrate a processor-enabled method 10 of deleting data 15 of a user 20 on an electronic device 30, such as a smart phone 30, tablet computer, or the like. Such an electronic device 30 is of the type having a processor 31, a volatile memory 32, a non-volatile memory 33, a display 34, and a user interface 35. The electronic device 30 also includes a factory-reset module 36 that restores the non-volatile memory 33 and volatile memory 32 to an initial factory setting, absent any user data 15.

The method 10 includes the steps 42 of providing a software application 40 resident in the non-volatile memory 33 of the electronic device 30. In situations where the user 20 believes he may need to protect his data 15, the user 20 can run the software application 40 so that the software application 40 is in a standby mode, ready to be activated if receiving a proper input from the user with the user interface 35. In some situations, the user 20 may decide to perform the step 44 of activating the software application 40 upon starting the electronic device 30, so that the software application 40 is always resident in the volatile memory 32 of the electronic device 30 and relatively easy to activate.

Then, in situations requiring the protection of the data 15, typically to prevent a third party from accessing the date 15 of the user 20, the user 20 uses the user interface 35 to activate a data destruction routine 50 of the software application 40. The data destruction routine 50 performs the steps: 1) turning off the display 34 of the electronic device 30, or alternately displaying all black pixels on the display 34, 2) overwriting the data 15 of the user 20 in the non-volatile memory 33 with decoy data 60, and 3) initiating the factory-reset module 36. In some embodiments step 2) is omitted, relying on the factory reset module 36 to overwrite the data 15. The decoy data 60 may be all zeros, all ones, or random values, for example.

In some embodiments, the user interface 35 may include mechanical buttons 35 on the electronic device 30 (FIG. 1). In alternate embodiments the user interface 35 may include one or more so-called "soft buttons" 70 (FIG. 2), which may be displayed on a lock screen 37 (FIG. 2) of the electronic device 30, the display 34 in such an embodiment having a touch-screen interface. The user 20 in such embodiments may have to activate all of the mechanical buttons 35 simultaneously, such as the volume up, volume down, and power buttons, for example, for a preset period of time such as three seconds, for example, or all of the software buttons 70 displayed on the lock screen 37 of the electronic device 30, or some combination thereof, in order to activate the data destruction routine 50. Requiring the user 20 to actuate multiple of the user interface buttons 35,75 reduces the change of inadvertent activation of the data destruction routine 50. In some embodiments the display 34 is blank while the data destruction routine 50 is operating.

In some embodiments, a confirmation is required by the software application 40 when the user 20 initiates the data destruction routine 50, such as an alphanumeric confirmation code, a face ID using a camera (not shown) of the device, or a biometric confirmation such as a fingerprint using a fingerprint scanner (not shown) of the electronic device 30, if so equipped.

In order to quickly destroy the data 15 on the electronic device 30 when the data destruction routine 50 is activated, with electronic devices 30 that include a file index 38 or one or more key functional locations 39 or key file locations 29, the file index 38 and/or the one or more key functional locations 39 are overwritten with the decoy data 60 first, before overwriting the remaining portions of the user's data 15. In such an embodiment the one or more key functional locations 39 may include program or application files, display memory locations, operating system memory locations, or the like.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A processor-enabled method of deleting data of a user on an electronic device that comprises a processor, a volatile memory, a non-volatile memory, a display, and a user interface, and that includes a factory reset module in the non-volatile memory, the method comprising the steps:

provide a software application resident in the non-volatile memory of the electronic device;

activating the software application so that the software application is running in the volatile memory of the electronic device;

using the user interface to activate a data destruction routine of the software application, the data destruction routine including the steps:

turning off the display and locking the user interface;

overwriting user information in the non-volatile memory with decoy data; and initiating a factory reset module of the electronic device, wherein the smart electronic device displaying and the user interface including a software button for activating the data destruction routine, the software button being visible on a lock-screen of the display of the electronic device.

2. The processor-enabled method of claim 1 wherein the decoy data is all zeros.

3. The processor-enabled method of claim 1 wherein the decoy data is all ones.

4. The processor-enabled method of claim 1 wherein the decoy data is random.

5. The processor-enabled method of claim 1 wherein the non-volatile memory includes an index that references file locations in the non-volatile memory, the data destruction routine including the step:

writing the decoy data to the index of the non-volatile memory.

6. The processor-enabled method of claim 1 wherein the non-volatile memory and the volatile memory each include an index that references file locations therein, respectively, the data destruction routine including the steps:

writing the decoy data to the index of the non-volatile memory; and writing the decoy data to the index of the volatile memory locations.

7. The processor-enabled method of claim 1 wherein the non-volatile memory and the volatile memory each include key functional locations, the data destruction routine further includes the steps:

writing the decoy data to key functional locations of the non-volatile memory and the volatile memory.

8. A non-transitory computer-readable storage medium in an electronic device storing a set of instructions that, when executed by a processor of the device, cause the processor to perform operations comprising the steps:

receiving from a user interface a command to activate a data destruction routine, the data destruction routine including the steps:

turning off a display and locking the user interface;

overwriting information in a non-volatile memory with decoy data; and initiating a factory reset module of the electronic device, wherein the electronic device displaying and the user interface including a software button for activating the data destruction routine, the software button being visible on a lock-screen of a display of the electronic device.

9. The non-transitory computer-readable storage medium of claim 8 wherein the decoy data is all zeros.

10. The non-transitory computer-readable storage medium of claim 8 wherein the decoy data is all ones.

11. The non-transitory computer-readable storage medium of claim 8 wherein the decoy data is random.

12. The non-transitory computer-readable storage medium of claim 8 wherein the non-volatile memory includes an index that references file locations in the non-volatile memory, the data destruction routine including the step:

writing the decoy data to the index of the non-volatile memory.

13. The non-transitory computer-readable storage medium of claim 8 wherein the non-volatile memory and the volatile memory each include an index that references file locations therein, respectively, the data destruction routine including the steps:

writing the decoy data to the index of the non-volatile memory; and writing the decoy data to the index of the volatile memory locations.

14. The non-transitory computer-readable storage medium of claim 8 wherein the non-volatile memory and the volatile memory each include key functional locations, the data destruction routine further includes the steps:

writing the decoy data to key functional locations of the non-volatile memory and the volatile memory.

* * * * *